(12) United States Patent
Goto et al.

(10) Patent No.: US 8,728,577 B2
(45) Date of Patent: May 20, 2014

(54) METALLIC DECORATIVE SHEET, PRODUCTION METHOD OF METALLIC DECORATIVE SHEET, AND PRODUCTION METHOD OF INSERT MOLDED BODY USING METALLIC DECORATIVE SHEET

(75) Inventors: Yoshihide Goto, Aisai (JP); Kaoru Goto, Aisai (JP); Kenji Sakuma, Aisai (JP)

(73) Assignee: Sanwa Screen Co., Ltd., Aisai-shi (JP)

( * ) Notice: Subject to any disclaimer, the term of this patent is extended or adjusted under 35 U.S.C. 154(b) by 407 days.

(21) Appl. No.: 13/170,916

(22) Filed: Jun. 28, 2011

(65) Prior Publication Data

US 2011/0318545 A1  Dec. 29, 2011

(30) Foreign Application Priority Data

Jun. 29, 2010  (JP) ................. 2010-148097

(51) Int. Cl.
*B41M 5/00*  (2006.01)
(52) U.S. Cl.
USPC ............ 427/284; 427/256; 427/271; 156/242
(58) Field of Classification Search
USPC ............... 427/256, 271, 284; 156/242
See application file for complete search history.

(56) References Cited

U.S. PATENT DOCUMENTS

| | | | | |
|---|---|---|---|---|
| 5,604,006 A | * | 2/1997 | Ponchaud et al. | 428/67 |
| 5,831,766 A | * | 11/1998 | Martin et al. | 359/529 |
| 8,440,518 B2 | * | 5/2013 | Ogawa et al. | 438/197 |
| 2006/0240246 A1 | * | 10/2006 | Fukuda et al. | 428/328 |
| 2012/0048458 A1 | * | 3/2012 | Goto et al. | 156/245 |

FOREIGN PATENT DOCUMENTS

| | | |
|---|---|---|
| JP | 04120011 | 10/1986 |
| JP | H04120011 | 10/1992 |
| JP | 10-180795 | 7/1998 |
| JP | 2002036429 A | 2/2002 |
| JP | 2005288720 A | 10/2005 |
| JP | 2009051121 A | 3/2009 |

* cited by examiner

*Primary Examiner* — Mark Ruthkosky
*Assistant Examiner* — Christopher Polley
(74) *Attorney, Agent, or Firm* — Kramer Amado P.C.

(57) ABSTRACT

Provided is a production method of a metallic decorative sheet capable of preventing from getting detached at edge portions. The production method of a metallic decorative sheet for insert molding comprises steps of forming a metal thin-film layer 12 on a back surface of a transparent thermoplastic resin film 11; removing a first region J for displaying a non-metallic design on an outer surface of the thermoplastic resin film 11 and a second region K which is at least a part of edge region of the thermoplastic resin film 11 from the metal thin-film layer 12; and laminating an ink layer 14 on at least the metal thin-film layer 12 and the second region K.

2 Claims, 4 Drawing Sheets

METALLIC DECORATIVE SHEET, PRODUCTION METHOD OF METALLIC DECORATIVE SHEET, AND PRODUCTION METHOD OF INSERT MOLDED BODY USING METALLIC DECORATIVE SHEET

BACKGROUND OF THE INVENTION

1. Field of the Invention

The present invention relates to a metallic decorative sheet used for home electric appliances or the like and a production method thereof, and a production method of an insert molded body using the metallic decorative sheet.

2. Description of the Related Art

Conventionally, a molded body formed by coating a metallic decorative sheet (having a quality like metal) on a thermoplastic resin molded body used for home electric appliances has been known. The molded body is produced according to an insert molding method by disposing preliminarily the metallic decorative sheet in a die and injecting thermoplastic resin for forming the thermoplastic resin molded body into the die.

The molded body is commonly used in a display portion, a touch panel or the like of home electric appliances, thus, a back surface of the metallic decorative sheet is partially printed with a design of words, graphics or the like in non-metallic ink, and the entire back surface except the words and/or graphics is vapor deposited or sputtered with metallic ink.

As a production method of the metallic decorative sheet, there has been disclosed one in Japanese Patent Laid-open No. 2005-288720. As illustrated in FIG. 4, the production method comprises steps of printing on one surface of a transparent thermoplastic resin film 10 a design 130 to be displayed on an outer surface thereof, vapor depositing thereon a metal thin-film layer 112, subsequently printing an ink layer 114 to preventing the metal thin-film layer from being seen, and finally printing a binder layer 115 for binding with a thermoplastic resin molded body 120.

However, as illustrated in FIG. 4, when the thermoplastic resin molded body 120 is coated by the metallic decorative sheet 110 according to the insert molding method, there is a problem that a part of the metal thin-film layer 112 exposed in an edge region K of the metallic decorative sheet 110 may have a contact with the thermoplastic resin molded body 120.

Consequently, it would be difficult for the exposed part of the metal thin-film layer 112 to contact closely with the thermoplastic resin molded body 120; if adhered by an alkaline solution such as a bleaching agent or the like, the metal thin-film layer 112 would be dissolved (corroded) easily by the alkaline solution. Thereby, the metallic decorative sheet 110 detaches from the thermoplastic resin molded body 120 in the edge region K, which deteriorates the visual appearance of the product.

SUMMARY OF THE INVENTION

The present invention has been accomplished in view of the aforementioned problems, and it is therefore an object of the present invention to provide a metallic decorative sheet and a production method thereof, and a production method of an insert molded body capable of displaying on an outer surface of an insert molded body a metallic design and a non-metallic design as conventional, preventing a metal thin-film layer from being seen and from getting detached at an edge region.

To attain an object described above, the production method of a metallic decorative sheet according to the present invention comprises steps of: forming a metal thin-film layer on a back surface of a transparent thermoplastic resin film; removing a first region for displaying a non-metallic design on an outer surface of the thermoplastic resin film and a second region which is at least a part of edge region of the thermoplastic resin film from the metal thin-film layer; and laminating an ink layer on at least the metal thin-film layer and the second region.

According to the production method of the metallic decorative sheet of the prevention invention, the metal thin-film layer is formed on the back surface of the transparent thermoplastic resin film. It should be noted that any surface that finally serves as an outer surface of the insert molded body is defined as the outer surface of the thermoplastic resin film.

Thereafter, a first region for displaying a non-metallic design on the outer surface of the thermoplastic resin film and a second region which is at least a part of edge region of the thermoplastic resin film are removed from the metal thin-film layer. According thereto, on the back surface of the transparent thermoplastic resin film, there exist portions where the metal thin-film layer is present and the other portions where the metal thin-film layer has been removed. Further, according to the production method of the metallic decorative sheet of the prevention invention, an ink layer is laminated on at least the metal thin-film layer and the second region.

Thus, according to the production method of the metallic decorative sheet of the prevention invention, on the metal thin-film layer, an ink layer is formed to prevent the metal thin-film layer from being seen. Moreover, ink enters into the second region which is at least a part of edge region of a contact surface contacting the thermoplastic resin molded body to form the ink layer, thereby, the metal thin-film layer can be prevented from becoming exposed in the edge region of the contact surface contacting the thermoplastic resin molded body where the metallic decorative sheet is formed.

In addition, by laminate an ink layer on the first region further, it is possible to form a non-metallic design having colors of ink contained in the ink layer, or alternatively, by not laminating the ink layer on the first region, it is also possible to form thereon a transparent window as an aspect of the non-metallic design. It should be noted that it is possible to laminate on the first region another ink layer containing ink of colors different from the ink contained in the ink layer before the ink layer according to the prevent invention is laminated.

Thus, according to the production method of the metallic decorative sheet of the prevention invention, it is not only possible to display a design on the outer surface of the insert molded body and prevent the metal thin-film layer from being seen, but also possible to product the metallic decorative sheet capable of preventing itself from getting detached at the edge region without increasing production steps in comparison to conventional production methods.

It is acceptable that the size of the thermoplastic resin film is defined preliminarily; it is also acceptable to cut a thermoplastic resin film having a size greater than the predefined size along a desired edge region into the predefined size.

To attain an object described above, a production method for producing an insert molded body of the present invention is performed by integrally molding the metallic decorative sheet produced according to the production method mentioned in the above and a thermoplastic resin and comprises steps of: laminating a binder layer on the ink layer laminated on the thermoplastic resin film; performing a forming process on the metallic decorative sheet laminated with the binder layer by bending it to follow an outer periphery of the thermoplastic resin to be molded; and disposing the metallic decorative sheet after the forming process at a predefined position in a die configured to form a cavity and injecting the thermoplastic resin to form the insert molded body.

According to the production method for producing an insert molded body of the present invention, after the binder layer is laminated on the link layer of the metallic decorative sheet produced according to the production method of the metallic decorative sheet of the present invention, it is subjected to a forming process by bending it to follow the outer periphery of the thermoplastic resin to be molded.

Thereafter, according to the production method for producing an insert molded body of the present invention, the metallic decorative sheet after the forming process is disposed at a predefined position in a die and the insert molded body is produced according to the injection of thermoplastic resin.

Thus, according to the production method for producing an insert molded body of the present invention, it is not only possible to display a design on the outer surface of the insert molded body and prevent the metal thin-film layer from being seen, but also possible to produce the metallic decorative sheet capable of preventing itself from getting detached at the edge region without increasing production steps in comparison to conventional production methods.

In the present invention, it is necessary to cut the thermoplastic resin film into the predefined size as mentioned above in any step prior to the step of disposing the thermoplastic resin film at the predefined position in the die.

To attain an object described above, the metallic decorative sheet according to the present invention comprises a metal thin-film layer formed on a back surface of a transparent thermoplastic resin film, and an ink layer formed on the metal thin-film layer of the thermoplastic resin film; wherein the metal thin-film layer is formed on the back surface of the thermoplastic resin film with a first region for displaying a non-metallic design on an outer surface of the thermoplastic resin film and a second region which is at least a part of edge region of the thermoplastic resin film removed therefrom; and the ink layer contacts the back surface of the thermoplastic resin film in the second region.

According to the metallic decorative sheet of the present invention, the metal thin-film layer is formed on the back surface of the transparent thermoplastic resin film with the first region for displaying a non-metallic design on the outer surface of the thermoplastic resin film and the second region which is at least a part of edge region of the thermoplastic resin film removed therefrom. Thereafter, the ink layer is disposed on the metal thin-film layer formed on the thermoplastic resin film. The ink layer contacts the back surface of the thermoplastic resin film in the second region.

Thus, according to the metallic decorative sheet of the present invention, since the ink layer is formed on the metal thin-film layer to prevent the metal thin-film layer from being seen, the metal thin-film layer can be prevented from being seen.

Further, since the ink layer contacts the back surface of the thermoplastic resin film in the second region which is at least a part of edge region of the thermoplastic resin film, the metal thin-film layer in this part of edge region is prevented from being exposed, consequently, it is prevented from getting detached at the part of edge region.

Furthermore, since the ink, layer is visible through the transparent thermoplastic resin film in the first region for displaying a non-metallic design, the non-metallic design having colors of the ink layer can be displayed. It is acceptable that the ink layer contacts the back surface of the thermoplastic resin film in the first region for displaying a non-metallic design; it is also acceptable to laminate another transparent material layer over the ink layer so that the colors of the ink layer are visible therethrough.

Moreover, it is preferred that the second region includes the entire edge region of the thermoplastic resin film.

DETAILED DESCRIPTION OF THE PREFERRED EMBODIMENTS

Figure 1:
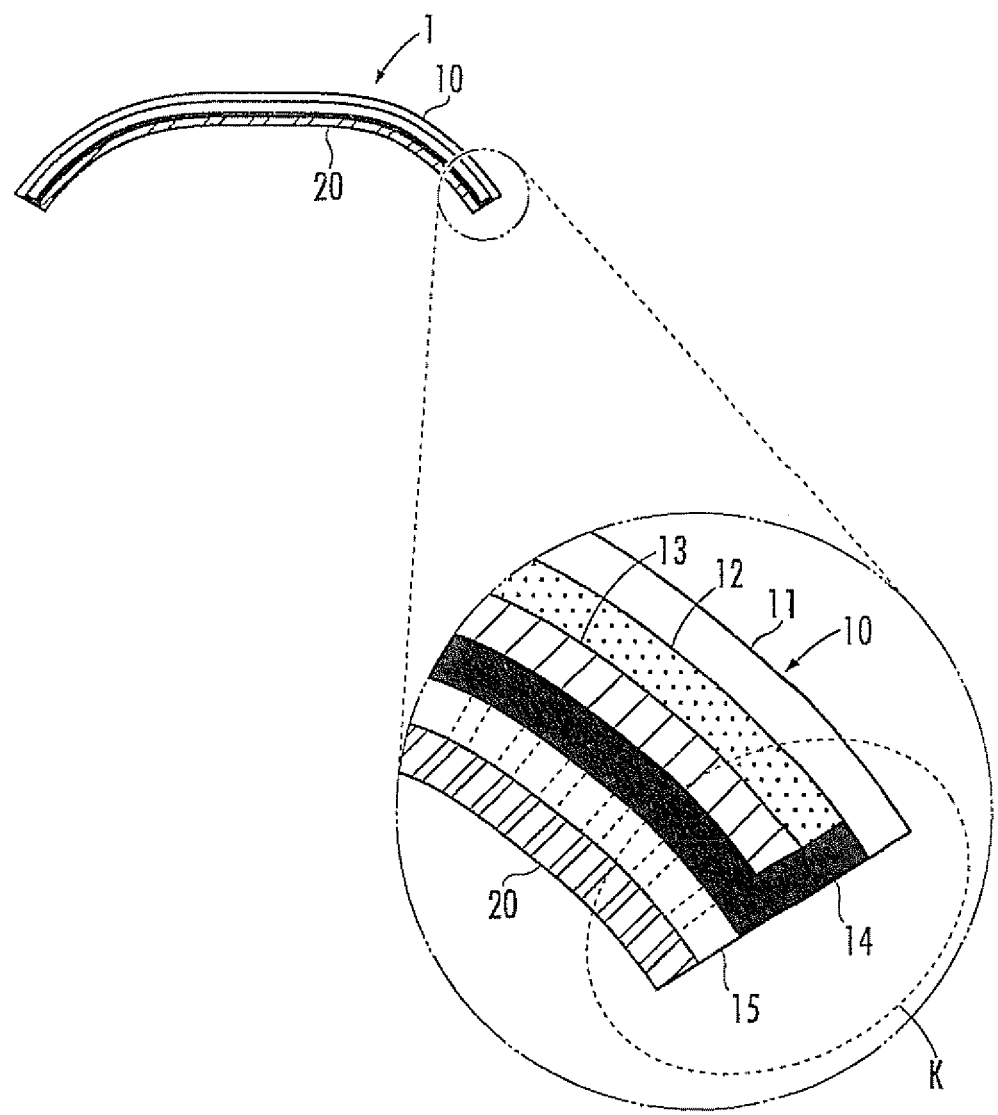
FIG. 1 is a cross-sectional view of an insert molded body produced according to the present invention.

As illustrated in FIG. 1, an insert molded body 1 produced according to a production method of the present embodiment includes a metallic decorative sheet 10 (having a quality like metal) and a thermoplastic resin molded body 20. A surface of the metallic decorative sheet 10 which will be in contact with the thermoplastic resin molded body 20 is laminated sequentially with a transparent thermoplastic resin film 11 serving as a base plate, a metal thin-film layer 12, a protection layer 13, an ink layer 14, and a binder layer 15.

(Production Method of the Insert Molded Body 1 of the Present Embodiment)

Hereinafter, with reference to FIG. 2 and FIG. 3, the production method of the insert molded body 1 of the present embodiment will be described.

Figure 2:
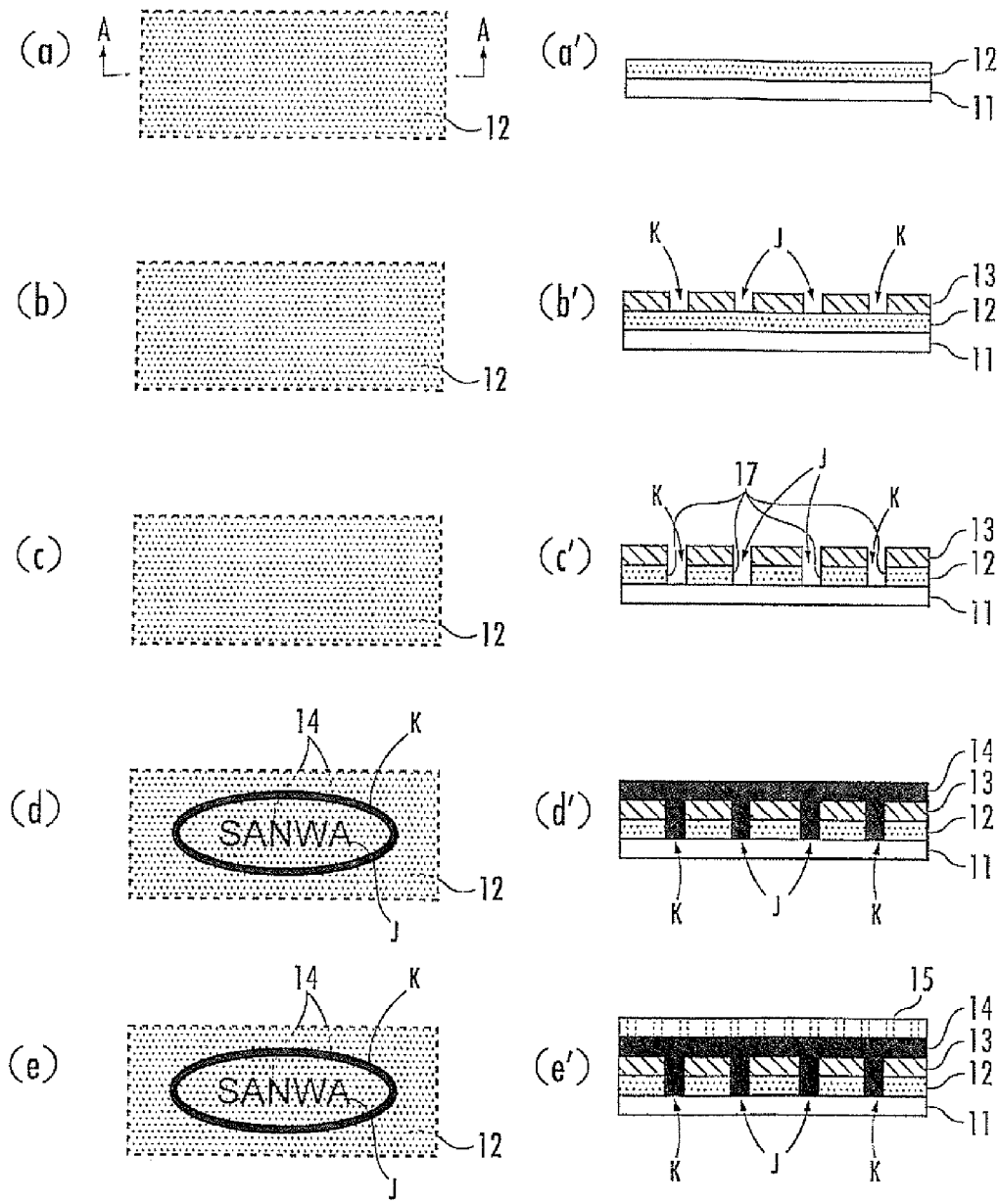
FIG. 2(a) to FIG. (2e') are plain views and cross-sectional views along A-A line, respectively, for illustrating a production method according to the present invention (Part 1).

As a first step in the production method of the insert molded body 1 of the present embodiment as illustrated by FIG. 2(a) and FIG. 2(a'), the metal thin-film layer 12 is formed on a surface of the transparent thermoplastic resin film 11 which will be in contact with the thermoplastic resin molded body 20, namely the back surface of the transparent thermoplastic resin film 11.

The transparent thermoplastic resin film 11 is used as a base plate and is composed of Polyethylene Terephthalate (PET) resin, Polymethyl Methacrylate (PMMA) resin, Polycarbonate (PC), ABS resin and the like. The metal thin-film layer 12 is formed according to various film-forming methods such as vacuum deposition, sputtering or the like of Al, Sn, Pb and the like.

As a second step illustrated by FIG. 2(b) and FIG. 2(b'), the protection layer 13 is formed by screen-printing 2-pack urethane curing ink or polyester ink if the transparent thermoplastic resin film 11 is made of PET, or organic ink such as polyester ink if the transparent thermoplastic resin film 11 is made of PC on regions of the metal thin-film layer 12 desired to be remained. A region (first region J) desired to display a non-metallic design on an outer surface of the insert molded body 1 and an edge region K (second region K) constituting an edge region of a contact surface which will be in contact with the thermoplastic resin molded body 20 are the regions of the metal thin-film layer 12 desired to be removed, and the other regions are the regions of the metal thin-film layer 12 desired to be remained as a metallic design.

As a third step illustrated by FIG. 2(c) and FIG. 2(c'), the laminated thermoplastic resin film 11 is cleaned with an alkaline solution such as aqueous sodium hydroxide or the like to dissolve and remove the metal thin-film layer 12, thereby, forming on the back surface of the transparent thermoplastic resin film 11 a portion which has the metal thin-film layer protected by the protection layer 13 having cross-sectionally a convex shape and unprocessed portion 17 formed by removing the metal thin-film layer and having cross-sectionally a concave shape. The unprocessed portion 17 includes the first region J and the edge region K (the second region K).

It is preferred that the back surface of the laminated transparent thermoplastic resin film 11 is cleaned with pure water after the alkaline cleaning, or neutralized with dilute sulfuric acid first and then cleaned with pure water.

As a fourth step illustrated by FIG. 2(d) and FIG. 2(d'), the ink layer 14 is formed on the protection layer 13 and in the unprocessed portion 17 by screen-printing an organic ink substantially the same as the one used to form the protection layer 13 on the back surface of the thermoplastic resin film 11.

It is also acceptable to form the ink layer 14 according to offset printing.

If it is desired to differentiate the color of ink for the first region J for displaying a non-metallic design of words, graphics or the like on the outer surface of the insert molded body 1, the color of ink for the edge region K (the second region K), and the color of ink for preventing the metal thin-film layer 12 from being seen, firstly different inks are injected into the unprocessed portion 17 for constituting the design desired to be displayed on the outer surface of the insert molded body 1 (the first region J) and the unprocessed portion 17 for constituting the edge region K (the second region K) respectively to perform a screen-printing, and thereafter, the ink for preventing the metal thin-film layer 12 from being seen is used to perform the screen-printing entirely.

In addition, in order to color the non-metallic design (the first region J) of words, graphics or the like desired to be displayed on the outer surface of the insert molded body 1 according the color of the ink layer 14, it is acceptable to form the ink layer 14 after a transparent resin or the like is screen-printed on the first region J on a condition that the color of the ink layer 14 is visible therethrough.

Further, if partial regions of the unprocessed portion 17 to be displayed as the non-metallic design are not laminated with the ink layer 14, it is possible to form the uncovered partial regions into transparent windows serving as one aspect of the non-metallic design.

As a fifth step illustrated by FIG. 2(e) and FIG. 2(e'), the binder layer 15 is formed by screen-printing a binder binding the metallic decorative sheet 10 to the thermoplastic resin molded body 20 on the ink layer 14. The binder may be selected appropriately from acryl resin, urethane resin, polyester resin, vinyl chloride resin or the like according to the type of resin used for the thermoplastic resin molded body 20.

The production method of the metallic decorative sheet 10 is described above.

Hereinafter, the pre-treatment of the metallic decorative sheet 10 prior to the inserting molding is described.

When a plurality of the metallic decorative sheets 10 are produced on one piece of film, as a sixth step, the one piece of film is roughly cut into a plurality of separated metallic decorative sheets 10 according to a necessary size range, as illustrated by FIG. 3(f).

Figure 3:
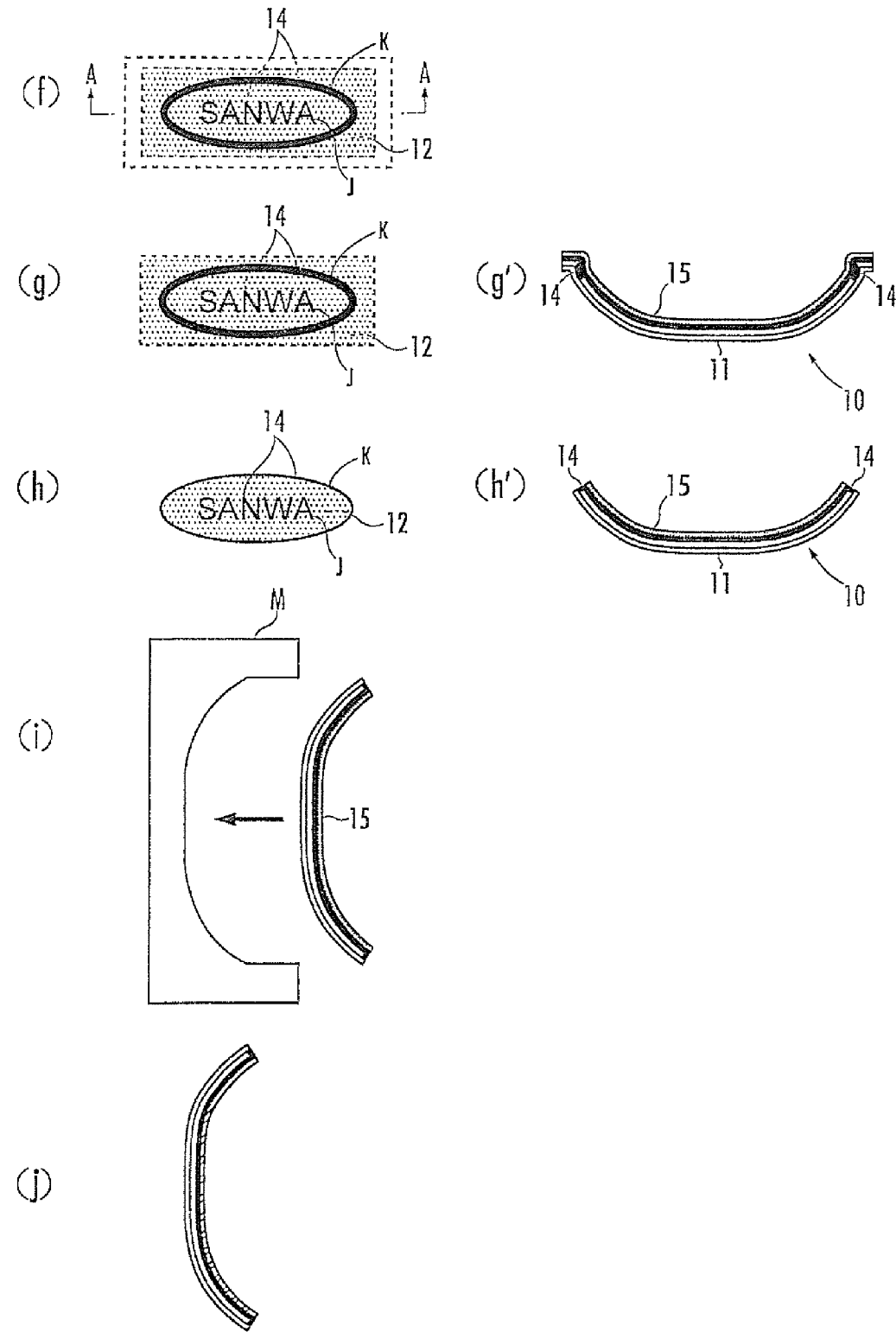
FIG. 3(f) to FIG. 3(j) are plain views and cross-sectional views along A-A line, respectively, for illustrating a production method according to the present invention (Part 2).
Figure 4:
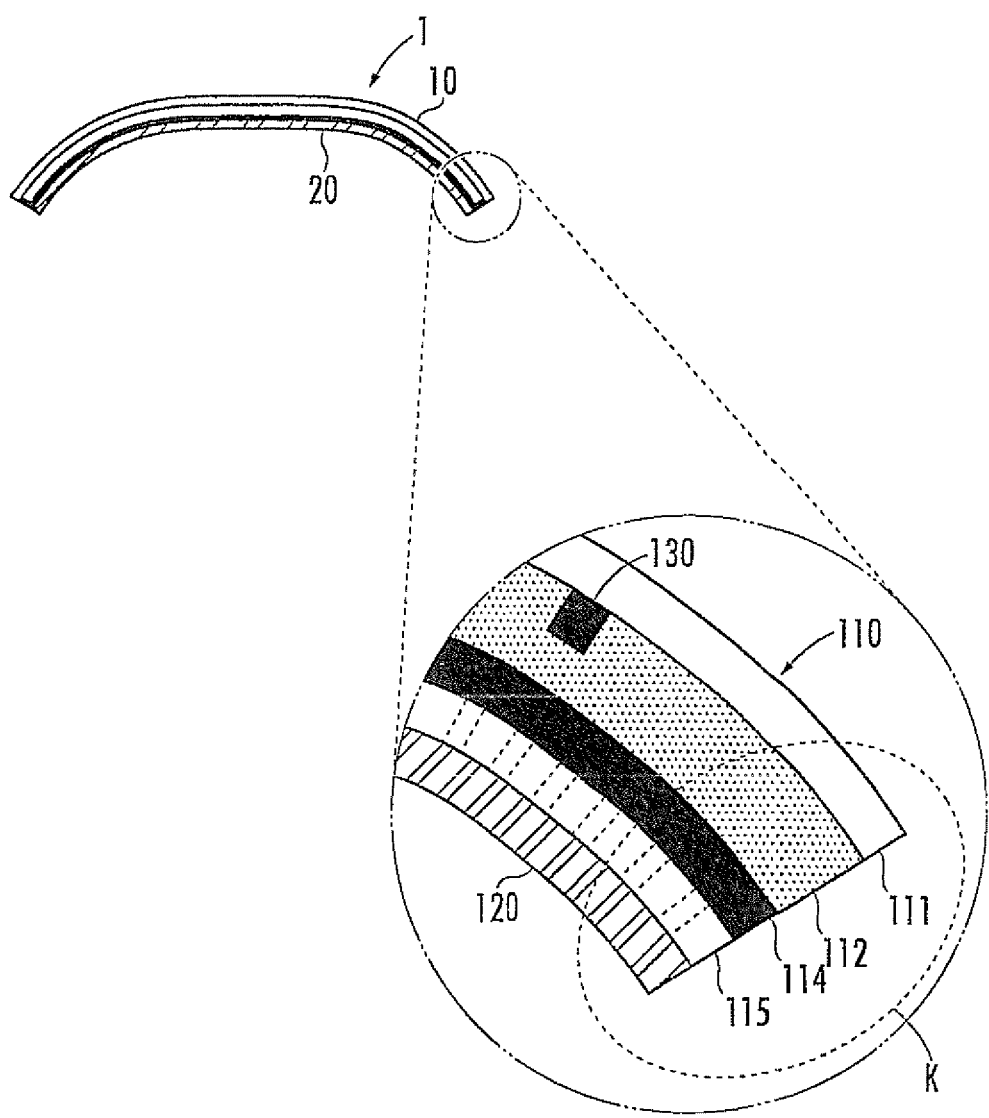
FIG. 4 is a cross-sectional view of an insert molded body produced according to a production method of a conventional art.

As a seventh step illustrated by FIG. 3(g) and FIG. 3(g'), a forming process such as air-pressure forming, hot pressing or the like is performed on the metallic decorative sheet 10. The forming process is performed on a surface of the metallic decorative sheet 10 opposite to the thermoplastic resin molded body 20 so that the surface bends along the outer periphery of the thermoplastic resin molded body 20. If the thermoplastic resin molded body 20 has a 3 dimensional shape, the forming process is performed to form the metallic decorative sheet 10 into the corresponding 3 dimensional shape.

As an eighth step illustrated by FIG. 3(h) and FIG. 3(h'), the metallic decorative sheet 10 after the forming process is cut to have the same shape as the insert molded body 1.

The cutting process is performed so that the ink layer 14 formed in the unprocessed portion 17 for constituting the edge region K (the second region K) in the metallic decorative sheet 10 is positioned at the age of the metallic decorative sheet 10.

In addition to the sequence of the sixth step, the seventh step and the eighth step after the fifth step, it is possible to produce the metallic decorative sheet 10 in such a sequence of the cutting process described as the eighth step and the forming process described as the seventh step after the fifth step. In such case, the rough cutting process described as the sixth step can be omitted.

Finally, a ninth step for producing the insert molded body 1 by the usage of the metallic decorative sheet 10 will be described.

First, as illustrated by FIG. 3(i) and FIG. 3(i'), the metallic decorative sheet 10 after the cutting process is disposed in a die M configured to form a cavity in such a direction that the binder layer 15 will be in contact with the thermoplastic resin molded body 20. Thereafter, thermoplastic resin is injected into the cavity to form the thermoplastic resin molded body 20.

(Effects of the Production Method According to the Present Embodiment)

According to the production method of the insert molded body 1 of the present embodiment, the ink layer 14 is formed on the metal thin-film layer 12 vapor deposited on the transparent thermoplastic resin film 11, which makes it possible to prevent the metal thin-film layer 12 from being seen.

Further, ink enters into the unprocessed portion 17 formed at the regions desired to display the design on the outer surface of the insert molded body 1 to form the ink layer 14. Thereby, when viewed from the outer surface of the insert molded body 1, the ink layer 14 entered into the first region J of the unprocessed portion 17 can be displayed on the outer surface through the transparent thermoplastic resin film 11, consequently, the design can be displayed clearly.

Furthermore, ink enters into the edge region K (the second region K) of the contact regions in the unprocessed portion 17 which will be in contact with contacting the thermoplastic resin molded body 20 and reaches the back surface of the thermoplastic resin film 11 to form the ink layer 14. Thus, as illustrated by FIG. 3(j), since the metallic decorative sheet 10 has been cut along the edge region K (the second region K), though the ink layer 14 is exposed in the edge region K (the second region K), the metal thin-film layer 12 is not exposed. Therefore, also in the case of producing the insert molded body 1 by injecting thermoplastic resin onto the metallic decorative sheet 10 treated by the cutting process, the metal thin-film layer 12 of the metallic decorative sheet 10 is not exposed in the edge region K (the second region K), consequently, the metallic decorative sheet 10 can be prevented from getting detached in the edge region K (the second region K).

As described in the above, according to the production method of the insert molded body 1 of the present embodiment, by screen-printing of ink for one time, the metal thin-film layer 12 can be prevented from being seen, the design can be displayed on the outer surface of the insert molded body 1, and the metallic decorative sheet 10 can be prevented from getting detached in the edge region K.

The prevention effect of the detachment of the metallic decorative sheet 10 from the insert molded body 1 produced by the production method of the prevent invention at the edge region K (the second region K) has been tested. Specifically, the insert molded body 1 was dipped in chlorine bleach mixed with sodium hydroxide for 24 hrs at room temperature; thereafter, whether the metallic decorative sheet 10 detaches in the edge region K was inspected. The result thereof is shown in Table 1.

TABLE 1

|  | Number of tests | Number of NG |
|---|---|---|
| Conventional insert molded body | 5 | 5 |
| Insert molded body of present embodiment | 5 | 0 |

As shown in Table 1, in all of the 5 experiments conducted on the conventional insert molded body, the metallic decorative sheet 10 detached in the edge region K. In contrast, in all of the 5 experiments conducted on the insert molded body 1 of the present embodiment, the metallic decorative sheet 10 was prevented from getting itself from being detached in the edge region K (the second region K).

As observed from the experiment result, it is obvious that the metallic decorative sheet 10 can be prevented from getting detached from the insert molded body 1 of the present embodiment in the edge region K (the second region K).

What is claimed is:

1. A production method of a metallic decorative sheet for insert molding, comprising steps of:
    forming a metal thin-film layer on a back surface of a transparent thermoplastic resin film;
    removing a first region for displaying a non-metallic design on an outer surface of the thermoplastic resin film and a second region which is at least a part of edge region of the thermoplastic resin film from the metal thin-film layer; and
    laminating an ink layer on at least the metal thin-film layer and the second region.

2. A production method for producing an insert molded body by integrally molding the metallic decorative sheet produced according to the production method in claim 1 and a thermoplastic resin, comprising steps of:
    laminating a binder layer on the ink layer laminated on the thermoplastic resin film;
    performing a forming process on the metallic decorative sheet laminated with the binder layer by bending it to follow an outer periphery of the thermoplastic resin to be molded; and
    disposing the metallic decorative sheet after the forming process at a predefined position in a die configured to form a cavity and injecting the thermoplastic resin to form the insert molded body.

* * * * *